United States Patent [19]
Jost

[11] Patent Number: 5,348,632
[45] Date of Patent: Sep. 20, 1994

[54] METHOD OF PLASMA TREATING A SURFACE OF A WORKPIECE, VACUUM TREATMENT APPARATUS AND PREVIOUSLY PLASMA TREATED PLASTIC ARTICLE

[75] Inventor: Stephan Jost, Trubbach, Switzerland

[73] Assignee: Balzers Aktiengesellschaft, Balzers, Switzerland

[21] Appl. No.: 984,531

[22] Filed: Dec. 2, 1992

[30] Foreign Application Priority Data

Dec. 23, 1991 [CH] Switzerland ............... 03 837/91-7

[51] Int. Cl.$^5$ .................................... B05D 3/06
[52] U.S. Cl. .......................... 204/165; 427/536; 427/539
[58] Field of Search .............. 204/165; 427/536, 539

[56] References Cited

U.S. PATENT DOCUMENTS

| | | | |
|---|---|---|---|
| 4,465,715 | 8/1984 | Manabe et al. | 427/536 |
| 4,678,644 | 7/1987 | Fukuta et al. | 422/186.05 |
| 5,152,879 | 10/1992 | Thurm et al. | 204/165 |
| 5,183,701 | 2/1993 | Jacobs et al. | 427/536 |

FOREIGN PATENT DOCUMENTS 087431 5/1982 Japan .................................. 427/536

OTHER PUBLICATIONS

Mapelston, Peter, "Plasma Technology Progress Improve Opinions In Surface Treatment", Modern Plastic International, No. 10, 20(1990) Oct., pp. 74–79.

*Primary Examiner*—John Niebling
*Assistant Examiner*—Kishor Mayekar
*Attorney, Agent, or Firm*—Notaro & Michalos

[57] ABSTRACT

In order to increase at least the adherence of lacquer on a workpiece surface consisting of at least substantially one synthetic, organic polymer, which workpiece is plasma treated in an environment of reactive gas, the treatment duration is selected at least close to an adherence maximum in a lacquer adherence-/treatment duration diagram and/or the gas pressure at least close to an adherence maximum in a lacquer adherence-/gas pressure diagram.

29 Claims, 3 Drawing Sheets

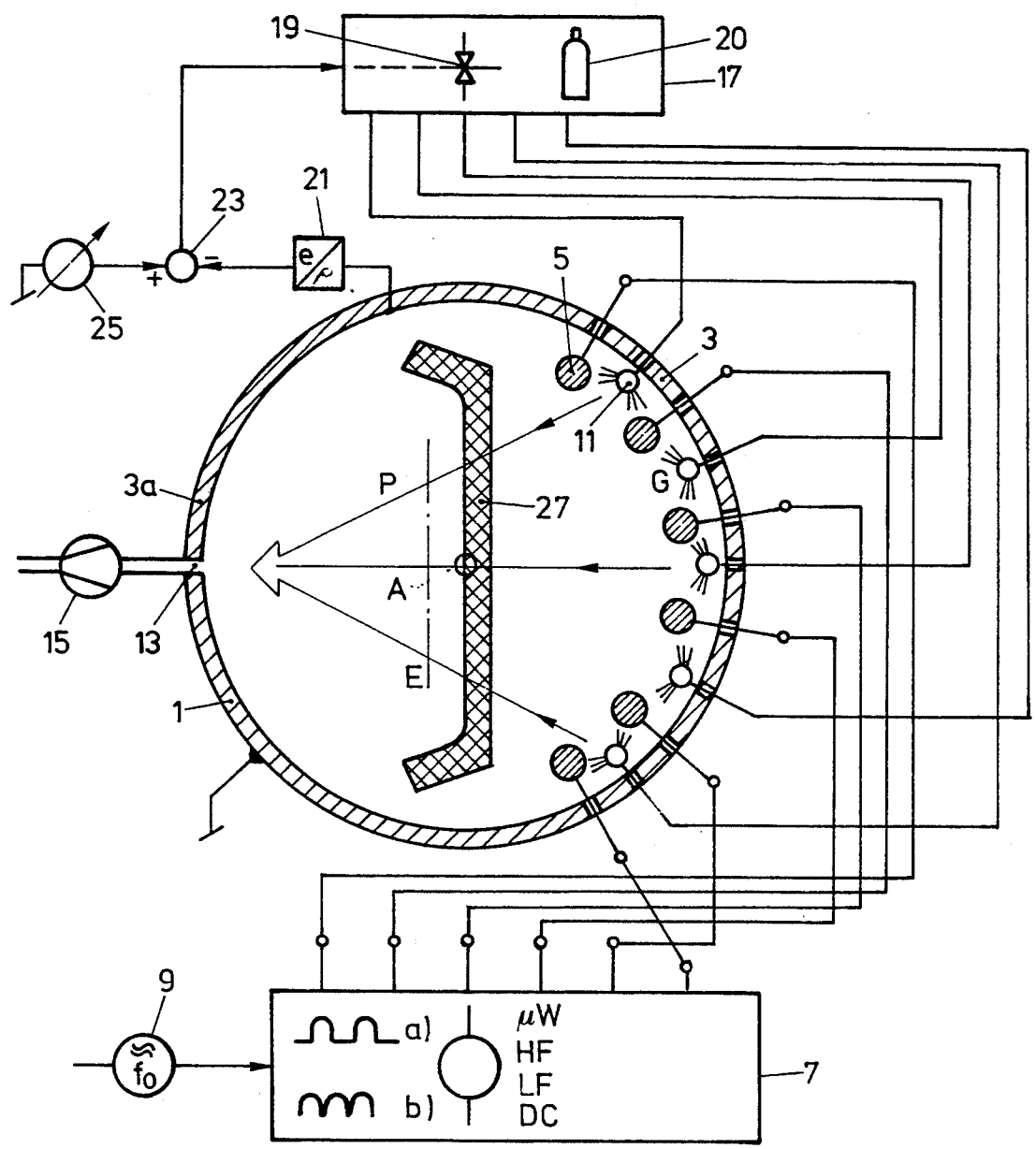
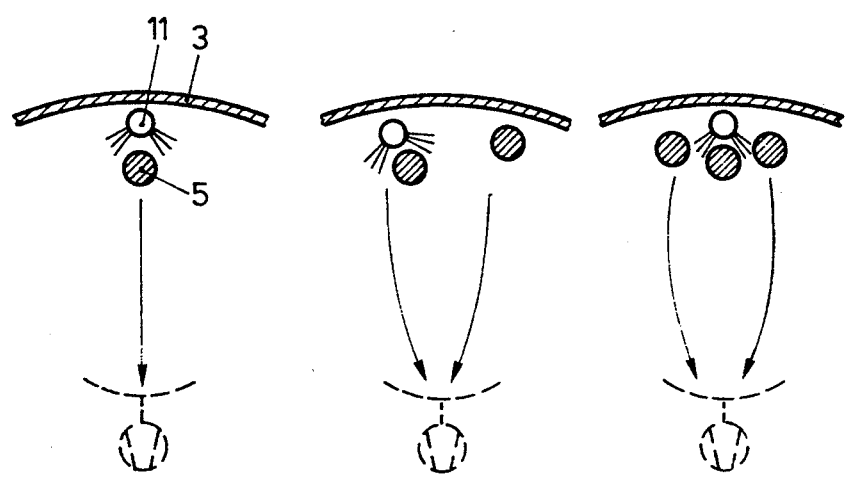
FIG. 1a  FIG. 1b  FIG. 1c

METHOD OF PLASMA TREATING A SURFACE OF A WORKPIECE, VACUUM TREATMENT APPARATUS AND PREVIOUSLY PLASMA TREATED PLASTIC ARTICLE

BACKGROUND OF THE INVENTION

1. Field of the Invention

The present invention is directed to a method of plasma treating a surface of a workpiece in an environment of reactive gas, which surface consists at least substantially of at least one synthetic, organic polymer, for increasing the adherence of lacquer on said surface.

It is further directed to a vacuum treatment apparatus for plasma treating a surface of a workpiece in an environment of reactive gas, which surface consists at least substantially of at least one synthetic, organic polymer, in order to increase the adherence of lacquer, which apparatus includes a vacuum recipient, an electrode arrangement for the generation of a plasma, a generator arrangement for the electrical supply of the electrode arrangement and a gas inlet arrangement.

Finally, the present invention is directed to a lacquered, previously plasma surface treated plastic material article.

2. Description of the Prior Art

An extensive literature exists directed on the surface treatment of workpieces. Reference is made to:

EP-A-349, 749; 0, 120, 307; 0, 129, 199; 0,152, 511; to the

U.S. Pat. Nos. 4,072,769; 4,338,420; 4,445,991; 4,297,187; 4,465,715; 4,584,965; 4,678,644; 4,576,692; 4,595,570; 4,874,453; 4,919,745; to the Japanese Kokai No. 5 385 782, further to the DE-A-3,822,482; 3,605,492; 3,408,837; 3,125,786; 3,638,719; 3,463,001; 1,105,149; 3,836,948; and to following papers:

Hall Jr., Journal of Applied Polymer Science, vol. 13, p. 2085 (1969), "Bondability of PP, PE by oxygen plasma treatments", M. Hudis in Hollahan & Bell, "Techniques and Applications of Plasma Chemistry", Wiley 1974, Matell et al., Ind. Eng. Chem. Prod. Rev. Vol. 3, (64), p. 300, "Low temperature oxide plasma . . . ", Schonhorn et al., J. Polymer Science B, 4 203 (1966), "A new technique for preparing low surface energy polymers for adhesive bonding", Modern Plastics International, vol. 20, No. 10, October 1990, Lausanne-CH, pages 74–79, Peter Maplestone: "Plasma technology progress improve options in surface treatment".

Accordingly, a large variety of methods for a plasma treatment of plastic material surfaces is known for improving wettability, bondability or the adherence of a lacquer thereon, in which differently generated plasmas are applied, such as e.g. pulsed plasmas according to the GB-A-2 105 729, microwave plasmas according to the U.S. Pat. No. 4,595,570. As reactive gases e.g. N2—, O2 gas mixtures are used such as disclosed in the U.S. Pat. No. 4,445,991.

SUMMARY OF THE INVENTION

A general object of the present invention is to provide especially for the treatment of large substrates with extent of the surface $\geq 1$ meter, a method and an apparatus for performing the said method by means of which the adherence of a lacquer on the surface treated is increased, may this be considered absolutely or relative to the time duration of such treatment, the pressure of reactive gas applied and/or power and/or amounts of gas supplied for the treatment.

This object is achieved by a method of plasma treating a surface of a workpiece in an environment of reactive gas in order to increase the adherence of lacquer, which surface consists at least substantially of at least one synthetic organic polymer, in which the duration of the treatment is selected at least close to an adherence maximum in a lacquer adherence-/duration of treatment-diagram and/or the gas pressure is selected at least close to an adherence maximum in a lacquer adherence-/gas pressure diagram, It has been recognized by the inventors that the adherence of lacquer on plasma treated organic polymer surfaces or of surfaces which substantially consist of at least one organic polymer, features a distinctive maximum as a function of time duration of the treatment and also as a function of the pressure of the reactive gas applied during the treatment.

Yet a further object is to provide a method especially for the treatment of surfaces of a plastic material based on polypropylene, but also for the treatment of surfaces which consist essentially of other polymers, in which the treatment duration T is selected to range between 15 s and 180 s, preferably between 20 s and 120 s, and even more preferably between 20 s and 90 s. Thereby a treatment time duration of about 60 s corresponds, such as has been discovered by the inventors of the present application, substantially to the duration for the maximum adherence in the mentioned lacquer adherence-/duration of treatment-diagram. Because the said maximum is relatively flat, exact maintaining of the optimal duration of treatment is not critical and thus good results are also reached within the said duration limits.

Because with reference to the said maximum in the mentioned adherence-/duration of treatment-diagram, unexpectable good adherences of lacquer are achieved already in vicinity of the said maximum, it is yet a further object of the invention to provide said method in which the duration of treatment relative to the duration of treatment for reaching maximal adherence of lacquer is in a range between $\frac{1}{3} T_o$ and $3 T_o$, preferably between $\frac{1}{2} T_o$ and $2 T_o$ and especially preferably between $\frac{2}{3} T_o$ and $3/2 T_o$ of the duration $T_o$ of treatment for reaching maximal adherence of lacquer. This is of great advantage if, e.g., for reasons of timing cycles of automatic charging and de-charging a processing apparatus with Workpieces to be treated, it is desired not to operate exactly at that duration $T_o$ of treatment which leads to a maximum adherence of lacquer.

Especially for the treatment of surfaces of plastic material based on polypropylene, but also for the treatment of surfaces which consist substantially of other polymeres, it is a further object of the invention to provide the said method in which the pressure may be adjusted in a relatively wide range, which is achieved by providing the reactive gas pressure for the said method to be within the range between $3.3 \cdot 10^{-3}$ and $40 \cdot 10^{-3}$ mbar, preferably between $6.6 \cdot 10^{-3}$ and $35 \cdot 10^{-3}$ mbar and most preferably between $9 \cdot 10^{-3}$ and $20 \cdot 10^{-3}$ mbar.

Considering the pressure $p_o$ of the reactive gas at which a maximum adherence is reached in the lacquer adherence-/gas pressure-diagram, it is a further object to provide the said method in which the pressure of reactive gas may be selected in a relatively wide range relative to the said pressure $p_o$ for maximum adherence. This is achieved by providing the said method with the reactive gas pressure being selected between $\frac{1}{4} p_o$ and 3 $p_o$, preferably between $\frac{1}{2} p_o$ and 2.5 $p_o$ and most preferably between $7/10 p_o$ and 1.5 $p_o$.

The maximum adherence of lacquer relative to pressure of the reactive gas is also relatively flat so that, here too, maintaining of the exact pressure $p_o$ value corresponding to the maximum adherence is not critical.

The mentioned pressure ranges are considerably lower than pressures usually selected for plasma surface treatment of plastic articles. Since the homogenity of such treatment in a plasma treatment chamber increases, within limits, with decreasing pressure of reactive gas, an increased homogenity of the treatment in a treatment chamber is realized by the invention, additionally to exploiting the said maxima, and further leading to the possibility to exploit the treatment space within the treatment chamber more accurately for larger workpieces or for larger numbers of workpieces due to the fact that an increased homogenity of surface treatment is achieved.

In a preferred mode of performing the inventive method, the lacquer adherence-/duration of treatment maximum as well as the said lacquer adherence-/reactive gas pressure maximum at a relatively low reactive gas pressure are simultaneously exploited.

It is a further object of the present invention to realize the said method so that it may be implemented in variously designed and variously operated vacuum treatment apparatuses. Thereby, especially a broad range of possible electrical plasma excitation shall become exploitable. This is realized by the said method in which the plasma is excited electrically by an electric signal having at least a substantial power component in the frequency spectrum at a frequency between DC and 1 MHz, preferably between DC and 100 kHz, and even more preferably between 50 and 200 Hz.

Especially it has been recognized that the excitation of the treatment plasma is preferably done by a signal with a fundamental frequency between 50 and 200 Hz in the frequency spectrum.

A further object of the present invention, namely to perform it as simply and inexpensive as possible is thus realized by excitating the plasma by a one- or two-way rectified electrical signal, said electrical signal being a signal with mains frequency, i.e. of about 50 Hz or 60 Hz, which leads to substantial simplification of the plasma excitation generator. To date, it is not completely clear to what an extent the higher harmonics of such one- or two-way rectified plasma excitation signals have contributed to the good results which were achieved by such an excitation.

It is still a further object to provide the method wherein the reactive Gas is selected as a $N_2,O_2$-gas mixture, preferably with a ratio $N_2/O_2$ of about 7:3.

The object of simplifying and reducing costs for such inventive method is further realized by selecting as the said reactive gas, air.

Thus, the application of a nitrogen-/oxygen-mixture as reactive gas and especially of air, such as of ambient air, allows to minimize the expenditures for the inventive method to such an amount that it results in an extremely low-cost treatment method.

It is further proposed as a preferred mode of performing the said inventive method to select the r.m.s (route mean square) value of the plasma generating voltage to be in the range between 1 and 6 kV (both limit values inclusive) and preferably between 2 and 5 kV (both limit values inclusive).

It is a further object of the present invention to provide the said method so that it may be implemented for surface treatments of large surfaces, which is achieved by arranging the surface of the workpiece or of the workpieces to be treated between at least one reactive gas inlet into a treatment chamber and a pump connection to said chamber. This leads to an excellent effect with respect to homogenity of the treatment along the said workpiece surfaces.

The general object of the present invention is further achieved by a vacuum treatment apparatus for plasma treating a surface of a workpiece in an environment of reactive gas for an increase of adherence of lacquer, which surface consists at least substantially of at least one synthetic, organic polymer, which apparatus includes a vacuum recipient, an electrode arrangement for the generation of a plasma, a generator arrangement for the electrical supply of the electrode arrangement and a gas inlet arrangement, whereby the electrode arrangement comprises at least two rod electrodes located adjacent the wall of the recipient, the gas inlet arrangement comprises at least one rod shaped, gas shower-like head for jetting reactive gas in a space between the wall of the recipient and at least one of the rod electrodes provided.

Due to the fact that the electrode arrangement includes at least two rod electrodes located adjacent the wall of the recipient and that the gas inlet arrangement includes at least one rod-shaped gas shower-type head jetting gas in a space between the wall of the recipient and at least one of the rod electrodes, it is achieved that the inner space of the vacuum recipient can be optimally exploited for surface treatment, which is especially advantageous for treatment of large workpiece surfaces, i.e. of surfaces with dimensions in one direction $\geq 1$ m, in that the apparatus for such treatment may be reduced in volume to the absolutely necessary treatment volume, which considerably reduces its costs.

The homogenity or uniformity of the treatment achieved by the inventive apparatus with the said arrangement of electrodes and of the gas inlet arrangement can be further improved as a further object of the present invention by providing the apparatus with a vacuum pump connected to the said recipient at a locus substantially opposite to the wall of the recipient with respect to the rod electrodes.

The advantages of connecting the gas inlet arrangement to an air supply, preferably to ambient air, and the advantages of connecting the rod electrodes to at least one generator adapted to supply a signal corresponding to a one- or a two-way rectified signal of a mains-frequency signal, have already been discussed with specific objects to be reached by the inventive method.

It is a further object of the present invention to provide the said apparatus so that substantially the entire chamber of the recipient is exploitable for surface treatment, which is realized by providing more than two, preferably three to five rod electrodes, so that the space available for homogeneous surface treatment in the vacuum recipient is enlarged to an amount according to substantially the entire inner space of the recipient. Based on a given recipient it thus becomes possible to treat as large as possible surfaces of workpieces or of as many as possible workpieces uniformly.

Further, to achieve the object of optimally exploiting the maxima of lacquer adherence, which were inventively recognized, i.e. to operate a treatment in the inventive apparatus at a desired predetermined pressure, it is further proposed to provide the apparatus with means for negative feedback controlling the pressure of the reactive gas.

To realize the further object of the present invention, namely to provide the said apparatus so that large surface areas of large workpieces or a large number of surface areas of workpieces may simultaneously be treated, it is proposed to provide the said apparatus with a plasma discharge area within said recipient with an extent of at least 1 m in one direction. Thus, workpieces with an extent of respectively at least 1 m may be surface-treated in such apparatus.

The further object, namely of simplifying the apparatus, is achieved by providing a stationary workpiece support and further, preferably, providing rod electrodes substantially at the same distance from an area for workpieces on the said support. This allows an especially simple design of the apparatus, in that workpieces, which are to be surface-treated, are not moved during the treatment as is customary for homogeneous treatment, but is not anymore necessary according to the present invention.

A further object of the present invention is to select as surfaces to be treated within said method a polyolefin surface, especially a surface of a plastic material mixture based on polypropylene or polyethylene.

It is yet a further object to provide in the said method of plasma treating a surface of a workpiece having an extent of $\geq 1$ m, which workpiece is especially a plastic material part for automotive vehicles, such as of car bodies.

It is still a further object to provide an article of plastic material with improved adherence for a lacquer or with an improved adherence of lacquer which is plasma-treated before being lacquered, of which the smallest extent of lacquered surface is $\geq 1$ m and at which the lacquer draw-off force is $\geq 1.8$N per mm width of lacquer strip, is even preferably $\geq 2.0$N per mm width of lacquer strip.

BRIEF DESCRIPTION OF THE DRAWINGS

The present invention will be better understood and objects other than those set forth above, will become apparent when consideration is given to the following detailed description thereof. Such description makes reference to the annexed drawings wherein:

FIG. 1 is a schematic top view of a vacuum treatment plant structured in accordance with the invention;

FIG. 1a illustrates another possibility for the arrangement of the recipient wall, electrode and shower-type heads;

FIG. 1b is a view similar to FIG. 1a of a further arrangement;

FIG. 1c is a view similar to view FIG. 1a of a still further arrangement;

DESCRIPTION OF THE PREFERRED EMBODIMENT

Figure 2:
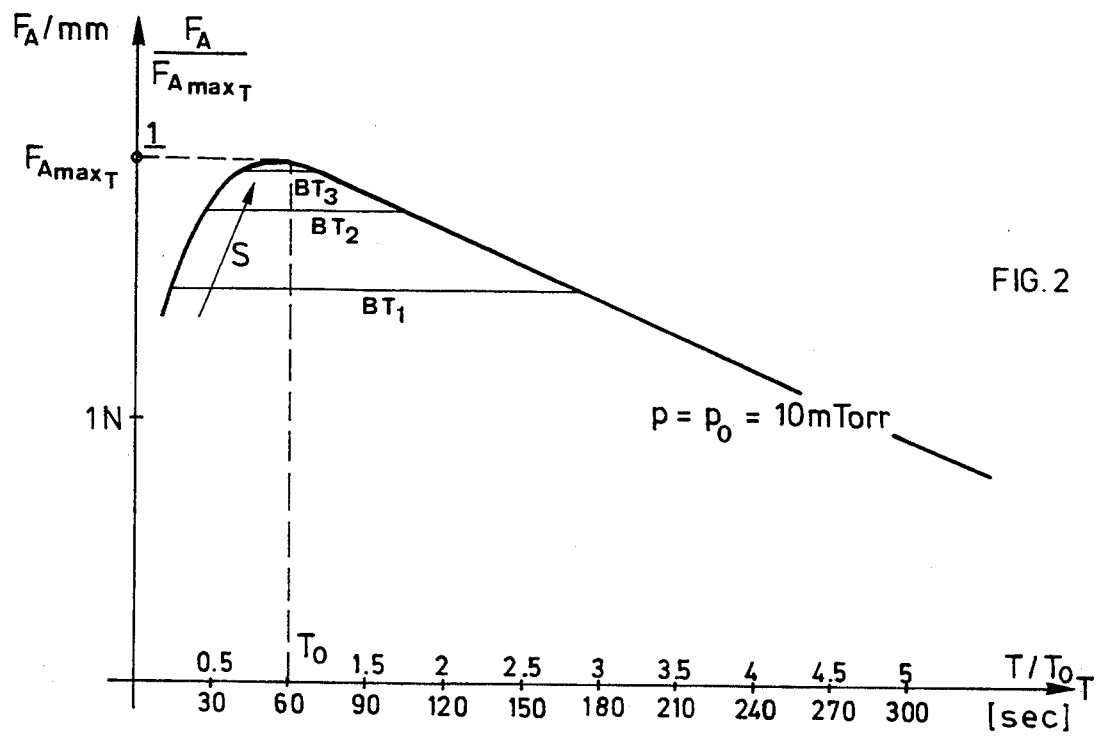
FIG. 2 is a lacquer adherence-/duration of treatment-diagram with treatment duration ranges exploited in accordance with the invention.

FIG. 1 illustrates schematically and simplified a cross-section of an example of an inventive treatment apparatus. It includes a vacuum recipient. One or a plurality, for instance six rod electrodes, are arranged adjacent the wall 3 of the recipient. In the apparatus according to FIG. 1 these electrodes are mounted substantially parallel to the wall and further substantially parallel to each other. The counter electrode to the rod electrodes 5 is formed by at least one inner electrode area in the vacuum recipient, preferably and as illustrated, by the inner wall of the vacuum recipient 1 itself.

The rod electrodes 5 are connected to a plasma excitation generator unit 7, in which one or a plurality of generators are foreseen which output an electrical plasma excitation signal in a frequency range between DC and RF. If microwave energy is applied, the rod electrodes are replaced by microwave couplers. That is, the frequency range of at least one predominant power component of the electrical plasma excitation signal varies from 0 Hz, which corresponds to DC or direct current, up to the radio frequency or RF range.

The rod electrodes 5 of the plurality of rod electrodes can be operated together by one generator of the unit 7 or they can be operated equally or differently in groups by means of respectively allocated generators of unit 7. The generator unit 7 is operated using standard AC power such as illustrated at 9. At a preferred embodiment of the generator unit 7, it supplies for the supply of the rod electrodes 5 one- or two-way rectified signals a or b, departing from the fundamental frequency-$f_o$-signal of normally 50 Hz or 60Hz of the standard power supplying the unit 7.

At the same area adjacent recipient wall 3, at which the at least one electrode 5 is located, according to FIG. 1, e.g. the six rod electrodes, rod-shaped reactive gas outlet shower-type heads 11 are provided. Preferably, as illustrated, they are mounted at a shorter distance to the wall portion 3 of the recipient than the rod electrodes 5.

In the apparatus according to FIG. 1, the rod-shaped reactive gas shower-type heads are located between two respective rod electrodes, whereby of FIGS. 1a, 1b and 1c, show other possibilities of relative arrangements of recipient wall 3, rod electrodes 5 and reactive gas shower-type heads 11, are shown.

On a wall portion 3a of the recipient 1 opposite the arrangement of rod electrodes 5 and gas infeed shower-type heads 11, a connection 13 for a pump with an evacuating pump 15 is foreseen. By means of this design a substantially linear flow path P directed transverse through the recipient is realized for the reactive gas G, which is jetted in at the shower heads, which path together with the preferred large areal rod electrode-/shower head-arrangement ensures a homogeneous distribution of plasma generated between the electrode rods 5 and the counter electrode 1 and of reactive gas reacting therein. Substantially along planes E such as illustrated by a dash-dotted line same distribution conditions prevail of the gases contributing to the treatment.

The reactive gas shower-type heads 11 are connected to a reactive gas supply 17, where aside of control valves 19 one or several gas supply tanks 20 are provided. By means of the valves the reactive gas mixture which is jetted out from the shower-type heads 11 into the recipient 1 is adjusted and set.

In a preferred embodiment the reactive gas mixture is a nitrogen-/oxygen-mixture, preferably with a mixing ratio of about 7:3. Thereby preferably air is used as reactive gas mixture and in such case the reactive gas supply 20 at unit 17 forms an air supply consisting preferably of ambient air. For the operation of the apparatus in accordance with the inventive method still to be described, it is preferred to provide a pressure detector for reactive gas in form of a converter 21 which e.g. is formed by a hot cathode ionization tube of known design. For negative feedback controlling the reactive gas pressure, possibly also of the reactive gas mixture, such a converter 21 operates as an actual value receiver in the negative feedback control circuit, which further comprises a difference forming unit 23, an adjustable rated value setting unit 25 and valves at the reactive gas supply unit 17 as regulating units.

Workpieces 27 which are to be surface treated are held in the recipient 1 by an appropriate stationar workpiece support.

Especially for workpiece surfaces substantially of polyolefins, especially substantially of mixtures of plastic materials based on polypropylene or polyethylene, the illustrated apparatus has proven as being excellently apt to perform the inventive method still to be described.

Differently from surface treatment methods in a reactive plasma known up to now, it is inventively possible to treat extremely large surfaces homogeneously, namely surfaces which have in at least one direction a dimension larger than or equal to 1 m. Accordingly, the illustrated apparatus operated by the inventive method still to be described, is excellently suited for surface treatment of plastic motor vehicle parts, such as for instance and especially of car body parts of plastic materials, such as for instance plastic car bumpers. This also is due to the excellent adherence of lacquer, which is obtained for a lacquer subsequently to be applied to a treated workpiece, which adherence is of high importance especially for the last mentioned workpieces.

The workpieces 27 are arranged preferably in a row along direction A within the recipient chamber of FIG. 1 and the rod electrodes and the rod-shaped reactive gas shower-type heads 11 are designed with a corresponding length and are preferably shaped in such a manner that they at least approximately extend at equal distances from the surfaces to be treated. Thereby, these distances are not critical within a wide range with respect to the treatment effect.

Figure 4:
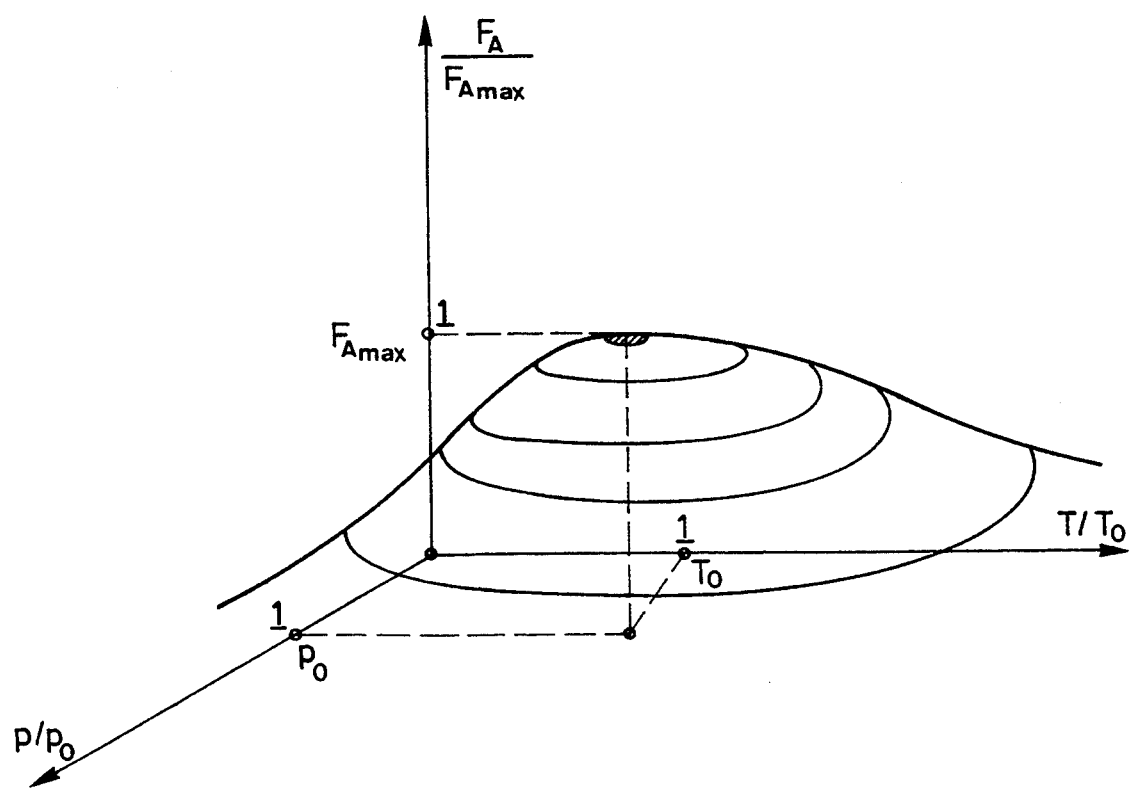
FIG. 4 is a qualitative three dimensional illustration of the adherence of lacquer in function of duration and pressure of treatment, corresponding to the basic character of a function-surface which forms the basis of the present invention.

FIG. 4 illustrates the principle behaviour of adherence of lacquer in function of the reactive gas treatment pressure p in the vacuum recipient and in function of the treatment duration T, which behaviour was recognized by the present invention and forms the basis of the present invention. The adherence of the lacquer is thereby defined by a draw-off force per mm of a lacquer strip applied on the surface treated and drawn off with a constant speed. The draw-off force per mm is measured perpendicularly to the surface wherefrom the lacquer is drawn off. The method of measuring the adherence of lacquer is described for instance in L. Palmquist, Deutsche Forschungsgemeinschaft für Oberflächenbehandlung, "Neue Entwicklungen bei der Lackierung von Kunststoffen", speeches of Mar. 20th to 21st, 1990, p. 195.

According to FIG. 4, the adherence of the lacquer defined by the draw-off force $F_A$ per mm width of lacquer strip in function of reactive gas pressure p and of duration T of treatment of the surface whereon the lacquer adheres, has a distinct maximum max which, however, is relatively flat.

FIG. 2 illustrates the adherence of lacquer $F_A$/mm defined as mentioned or the adherence $$\frac{F_A}{F_{AmaxT}}$$

standardized to the maximal adherence in function of absolute duration T of the treatment or of the standardized duration, standardized with respect to the optimal duration $T_o$. It can be seen that the lacquer adherence-/duration of treatment-diagram discloses a specific, but relatively flat maximum at $F_{AmaxT}$. The illustrated exemplary course has been measured at car bumpers with polypropylene surfaces, lacquered by a polyurethan lacquer after the inventive treatment. At these conditions the maximum adherence of lacquer is achieved with a treatment duration T of about 60 s. The adherence of the lacquer resulting corresponds to the draw-off force of about 2N per mm width of lacquer strip.

Whereas for other surface materials of the mentioned kind and/or other lacquers, considered absolutely, other draw-off forces and durations of treatment for optimal adherence may prevail, the basically illustrated course of the characteristic of adherence versus duration of treatment or pressure of reactive gas generally apply. The pressure of reactive gas for the record according to FIG. 2 amounts to 10 mTorr, corresponding to $13,3 \cdot 10^{-3}$ mbar. Also if the reactive gas pressure is changed, the course of adherence with a distinct maximum according to FIG. 2 as a function of the duration T of the treatment remains at least qualitatively basically the same.

Figure 3:
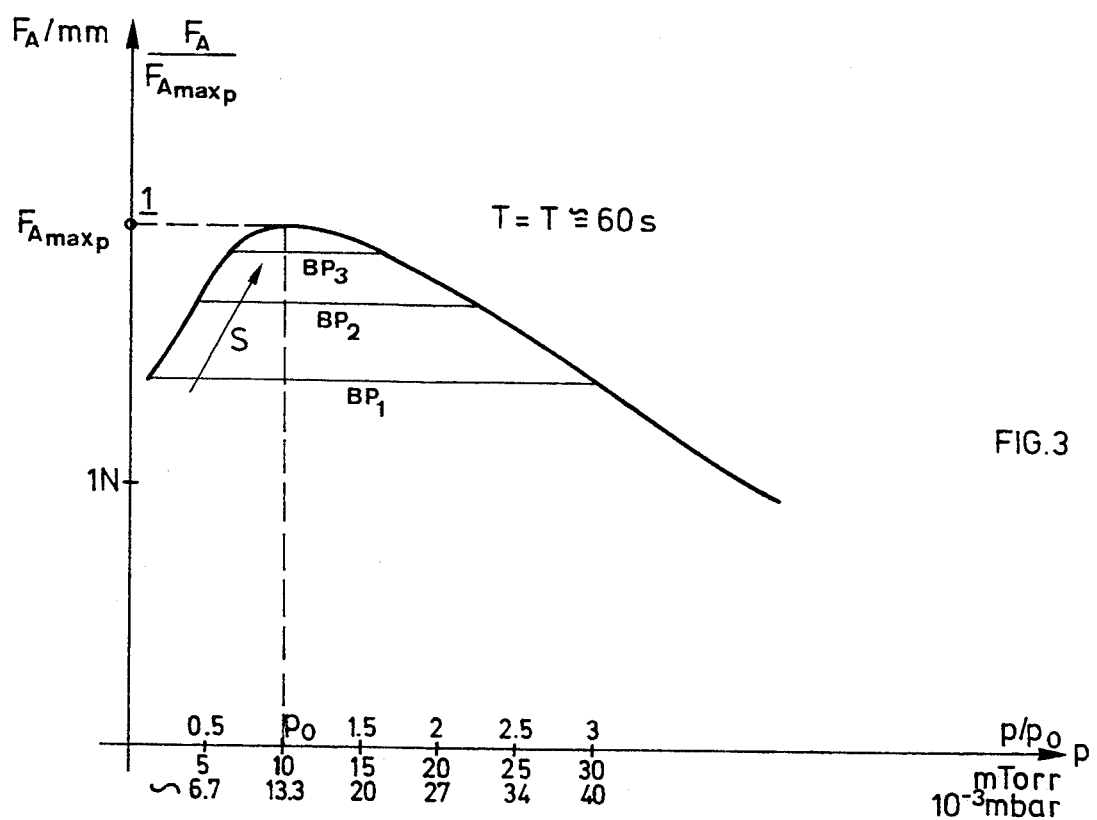
FIG. 3 is a lacquer adherence-/treatment pressure diagram with pressure ranges exploited in accordance with the invention.

In FIG. 3 the function of the absolute draw-off force $F_A$ and of the standardized draw-off force $F_A/F_{Amaxp}$ of lacquer adherence, in analogy to FIG. 2, is illustrated as a function of the reactive gas pressure p given in mTorr or in $10^{-3}$ mbar at the one side and standardized to the pressure $p_o$. The significant adherence maximum may also be recognized in this diagram, whereby the maximum is relatively flat. The diagram according to FIG. 3 was registered at a treatment duration T of about 60 s for a surface and lacquer as described in connection with FIG. 2. The course shown in FIG. 3 changes at the most quantitatively and not qualitatively if the duration of treatment or the surface to be treated or the lacquer is changed.

By operating the inventive method especially in an apparatus according to FIG. 1 and in combination near the optimal treatment duration $T_o$ and near the optimal reactive gas pressure $p_o$, adherences of lacquer on workpiece surfaces with extents of more than 1m according to draw-off forces were achieved, equal to or larger than 1.8N per mm lacquer strip, even drawoff forces equal or larger than 2.0N per mm.

Due to the fact that the maximum shown in the FIGS. 2 and 3 are relatively flat, the settings of the duration of treatment and/or of the pressure of reactive gas are advantageously uncritical.

The surface treatment which led to the courses according to the FIGS. 2 and 3 were made with air as reactive gas. The plasma discharge was generated with a two-way rectified 50 Hz voltage with an r.m.s.-value of between 1 and 6 kV, but preferably between 2 and 5 kV. The current per rod electrodes of a length of 1.2 m was about 0.8 A.

With the inventive apparatus plastic material articles were surface treated with the inventive method, having extents of the surface treated larger or equal 1 m in one direction, whereby after they were lacquered, adherences of the lacquer of at least 1.8N per mm and even of at least 2.0N per mm resulted. Such large lacquered and initially plasma treated plastic surfaces with a homogeneously distributed adherence of the lacquer in the stated ranges were not known to the inventors before.

In the FIGS. 2 and 3 the areas designated with $BT_x$ and $BP_x$ respectively indicate preferred ranges for treatment duration T and for reactive gas pressure p, considered absolutely or standardized, which can be exploited depending from other additional conditions, such as from a set charging and de-charging rhythm for workpieces to and from the apparatus or from given means for evacuating the chamber and for controlling the pressure therein. With respect to adherence of lacquer per se preference is made of the different ranges BT and BP according to the tendency direction illustrated by the arrow S.

It may further be seen that the inventive method operates at pressures of reactive gas of at most 100 mTorr corresponding to $133 \cdot 10^{-3}$ mbar and preferably at pressures with a maximum of 50 mTorr corresponding to $67 \cdot 10^{-3}$ mbar which influences very favourably the homogenity of the treatment along the surfaces, which again is the basis for homogeneously surface treating large ($\geq 1$ m) surfaces.

The relative position of the electrode arrangement and of the gas jetting nozzle arrangement with respect to the surfaces to be treated is extremely uncritical. This again forms a basis for treating practically arbitrarily shaped surfaces without an adjustment of the electrode positions and of the gas jetting nozzle positions.

This may be shown by the following table which discloses the ratio $F_{A1}/F_{A2}$ at the stated tests according to FIGS. 2 and 3 respectively and wherein:

$F_{A1}$: is the draw-off force at bumper portions at a distance of about 20 cm from the rod electrodes (minimal distance), $F_{A2}$: is the draw-off force at bumper portions at a distance of about 80 cm from the rod electrodes (minimal distance).

| Pressure $10^{-3}$ mbar | Duration | $F_{A1}/F_{A2}$ |
|---|---|---|
| 13,3 | 30 sec | 1.0 |
| 13,3 | 90 sec | 0.8 |
| 26,6 | 90 sec | 0.5 |
| 6,7 | 20 sec | 1.4 |
| 6,7 | 90 sec | 1.3 |

It is, thereby, distinctly to be noted that the ratio $F_{A1}/F_{A2}$ can shift as a function of pressure and duration of treatment in favour of more distant surface areas.

While there are shown and described present preferred embodiments of the invention, it is to be distinctly understood that the invention is not limited thereto, but may be otherwise variously embodied and practised within the scope of the following claims.

I claim:

1. A method for plasma treating a surface of a workpiece during a treatment duration and in an environment of reactive gas at a gas pressure, in order to increase an adherence of a lacquer to the surface, the surface consisting essentially of at least one synthetic, organic polymer, the method comprising:

selecting at least one of, the duration for the treatment, and the gas pressure for the reactive gas, such that if the duration is selected, the selected duration is within a range corresponding to a substantially flat region of an adherence maximum of a lacquer in a lacquer adherence-treatment duration diagram, and such that if the gas pressure is selected, the selected gas pressure is within a range corresponding to a substantially flat range of an adherence maximum of a lacquer in a lacquer adherence-gas pressure diagram; and plasma treating the surface of a workpiece following the at least one of the selected duration and selected gas pressure.

2. The method of claim 1 wherein the surface consist essentially of a plastic material based on polypropylene, the selected duration T being selected to be:

$$15 \text{ seconds} \leq T \leq 180 \text{ seconds}.$$

3. The method of claim 2 wherein the selected duration is selected to be:

$$20 \text{ seconds} \leq T \leq 120 \text{ seconds}.$$

4. The method of claim 3 wherein the selected duration is selected to be:

$$20 \text{ seconds} \leq T \leq 90 \text{ seconds}.$$

5. The method of claim 1 wherein, the selected duration T as based on a duration $T_o$ at which the adherence maximum of a lacquer in the lacquer adherence-treatment duration diagram occurs, is selected to be:

$$\tfrac{1}{3} T_o \leq T \leq 3 T_o.$$

6. The method of claim 5 wherein the selected duration is selected to be:

$$\tfrac{1}{2} T_o \leq T \leq 2 T_o.$$

7. The method of claim 6 wherein the selected duration is selected to be:

$$\tfrac{2}{3} T_o \leq T \leq 3/2 T_o.$$

8. The method of claim 1 wherein the surface consists essentially of a plastic material based on polypropylene, the selected gas pressure p being selected to be:

$$3.3 \cdot 10^{-3} \text{ mbar} \leq p \leq 40 \cdot 10^{-3} \text{ mbar}.$$

9. The method of claim 8 wherein the selected gas pressure is selected to be:

$$6.6 \cdot 10^{-3} \text{ mbar} \leq p \leq 35 \cdot 10^{-3} \text{ mbar}.$$

10. The method of claim 9 wherein the selected gas pressure is selected to be:

$$9 \cdot 10^{-3} \text{ mbar} \leq p \leq 20 \cdot 10^{-3} \text{ mbar}.$$

11. The method of claim 1 wherein, the selected gas pressure p as based on a pressure $P_o$ at which the adherence maximum of a lacquer in the lacquer adherence-gas pressure diagram occurs, is selected to be:

$\frac{1}{2} p_o \leq p \leq 3 p_o.$

12. The method of claim 11 wherein, the selected pressure is selected to be:

$\frac{1}{2} p_o \leq p \leq 2\frac{1}{2} p_o.$

13. The method of claim 12 wherein, the selected gas pressure is selected to be:

$7/10_o p_o \leq p \leq 1\frac{1}{2} p_o.$

14. The method of claim 1, including generating a plasma during the treatment using an electrical plasma excitation signal having at least one predominant power component in a frequency range between DC and 1 MHz, both inclusive.

15. The method of claim 1 wherein, the frequency range is between DC and 100 kHz, both inclusive.

16. The method of claim 14, wherein the frequency range is between DC and 10 kHz, both inclusive.

17. The method of claim 16, wherein the frequency is between 50 and 200 Hz, both inclusive.

18. The method of claim 14 including, generating the excitation signal by providing a standard power source having a fundamental frequency and rectifying the fundamental frequency.

19. The method of claim 1, in which said reactive gas is selected to be a $N_2$, $O_2$-gas mixture.

20. The method of claim 1, in which air is selected as said reactive gas.

21. The method of claim 19, wherein the reactive gas contains $N_2$ and $O_2$ in a ratio of $N_2/O_2$ of about 7:3.

22. The method of claim 1 including, generating a plasma during the treatment using a plasma generating voltage having a root mean square value between 1 and 6 kV, both inclusive.

23. The method of claim 22, wherein the root mean square value is between 2 and 5 kV, both inclusive.

24. The method of claim 1, in which said surface is a polyolefine surface.

25. The method of claim 24, in which a maximal dimension of the workpiece surface is $\geq 1$ meter.

26. The method of claim 24 wherein, the surface consisting essentially of a plastic material mixture based on a material selected from the group consisting of polypropylene and polyethylene.

27. The method of claim 25, wherein the workpiece is a plastic material part of a motor vehicle.

28. The method of claim 27, wherein the plastic material part of a motor vehicle comprises an automobile body.

29. The method of claim 1, in which the surface of the workpiece is arranged between at least one reactive gas inlet and a pump.

* * * * *